United States Patent
Hall et al.

(10) Patent No.: US 11,010,646 B2
(45) Date of Patent: May 18, 2021

(54) OBJECT TRACKING ASSISTED WITH HAND OR EYE TRACKING

(71) Applicant: Facebook Technologies, LLC, Menlo Park, CA (US)

(72) Inventors: Michael Hall, Seattle, WA (US); Byron Taylor, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 215 days.

(21) Appl. No.: 15/949,597

(22) Filed: Apr. 10, 2018

(65) Prior Publication Data
US 2019/0311232 A1 Oct. 10, 2019

(51) Int. Cl.
| | | |
|---|---|---|
| *G06K 9/68* | (2006.01) |
| *G06K 9/00* | (2006.01) |
| *G06T 7/73* | (2017.01) |
| *G06F 3/0488* | (2013.01) |
| *G06F 3/042* | (2006.01) |

(52) U.S. Cl.
CPC ......... *G06K 9/6857* (2013.01); *G06K 9/0061* (2013.01); *G06K 9/00281* (2013.01); *G06K 9/00389* (2013.01); *G06T 7/73* (2017.01); *G06F 3/0425* (2013.01); *G06F 3/04883* (2013.01)

(58) Field of Classification Search
CPC ............... G06K 9/6857; G06K 9/0061; G06K 9/00281; G06K 9/00389; G06T 7/73; G06F 3/0425; G06F 3/04883; G06F 3/012; G06F 3/0304; G06F 3/017; G06F 3/013; G06F 2203/012
See application file for complete search history.

(56) References Cited

U.S. PATENT DOCUMENTS

| | | | |
|---|---|---|---|
| 2012/0294478 A1* | 11/2012 | Publicover | G02B 27/0093 382/103 |
| 2014/0241614 A1* | 8/2014 | Lee | H04N 13/254 382/154 |
| 2017/0094184 A1* | 3/2017 | Gao | G01S 3/7864 |
| 2017/0160816 A1 | 6/2017 | Holz | |

* cited by examiner

*Primary Examiner* — John W Lee
(74) *Attorney, Agent, or Firm* — Fenwick & West LLP

(57) ABSTRACT

Embodiments relate to tracking and determining a location of an object in an environment surrounding a user. A system includes one or more imaging devices and an object tracking unit. The system identifies an object in a search region, determines a tracking region that is smaller than the search region corresponding to the object, and scans the tracking region to determine a location associated with the object. The system may generate a ranking of objects, determine locations associated with the objects, and generate a model of the search region based on the locations associated with the objects.

20 Claims, 7 Drawing Sheets

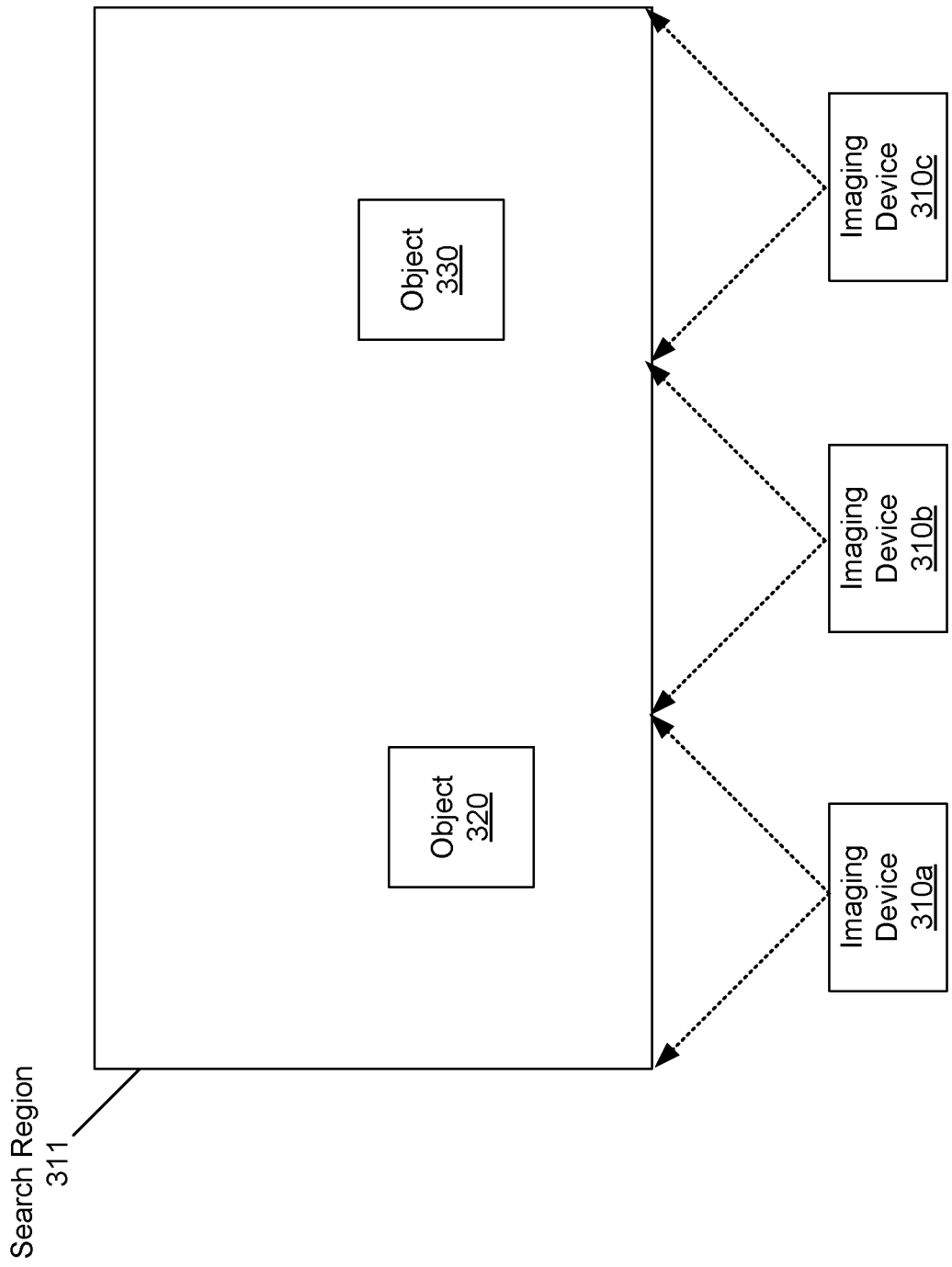

US 11,010,646 B2

OBJECT TRACKING ASSISTED WITH HAND OR EYE TRACKING

BACKGROUND

The present disclosure generally relates to artificial reality systems, and more specifically relates to tracking objects and obtaining location information of objects in a local area.

Virtual reality (VR) systems, augmented reality (AR), and mixed reality (MR) systems, can leverage the capture of objects in three dimensions (3D). Different camera imaging architectures provide different strengths and weaknesses, so certain camera imaging architectures may provide better performance than others in different operating conditions. It is desirable for a system to track objects, including objects of a user such as a user's hand or objects in the environment surrounding the user, to generate inputs and present the user with interactive displays according to the inputs. However, large quantities of data and computing resources are usually needed for effective real-time object tracking.

SUMMARY

Embodiments relate to tracking and determining one or more locations associated with an object in a monitored environment. A system includes one or more imaging devices and an object tracking unit. The system identifies an object in a search region of an image captured by the one or more imaging devices, determines a tracking region that is smaller than the search region corresponding to the object, and scans the tracking region over time to determine locations associated with the object over time. In some embodiments, the system may generate a ranking of objects in one or more search regions, determine tracking regions associated with the objects, scan the tracking regions according to the ranking of objects to determine locations associated with the objects over time, and generate a model of the one or more search regions or the environment based on the locations associated with the objects. An object may be associated with one or more locations. For example, a pose of a user's hand may be defined by the locations of multiple hand features (e.g., joints) in space.

In some embodiments, the object tracking unit receives search region image data of a search region captured by the one or more imaging devices. The object tracking unit identifies an object in the search region based on the search region image data. The object tracking unit determines a tracking region corresponding to the object from the search region image data, the tracking region being smaller than the search region. The object tracking unit receives tracking region image data of the tracking region captured by the one or more imaging devices. The object tracking unit determines a location associated with the object based on the tracking region image data of the tracking region.

In some embodiments, a first imaging device may generate the search region image data of the search region, and a second imaging device may generate the tracking region image data of the tracking region. The first imaging device may be the same type of device as the second imaging device, or may be a different type of imaging device. In some embodiments, a single imaging device may scan the search region to generate the search region image data, and the single imaging device may scan the tracking region to generate the tracking region image data.

In some embodiments, the system may provide for user selection of objects for location tracking. The system may include a hand tracking unit to determine a hand pose of a user or an eye tracking unit to determine an eye position of the user. The object tracking unit may determine a selection of an object based on the hand pose or the eye position of the user, and may scan a tracking region of the object over time to track locations associated with the object.

BRIEF DESCRIPTION OF THE DRAWINGS

FIG. 3A illustrates multiple imaging devices scanning a search region, in accordance with an embodiment.

Figure 1:
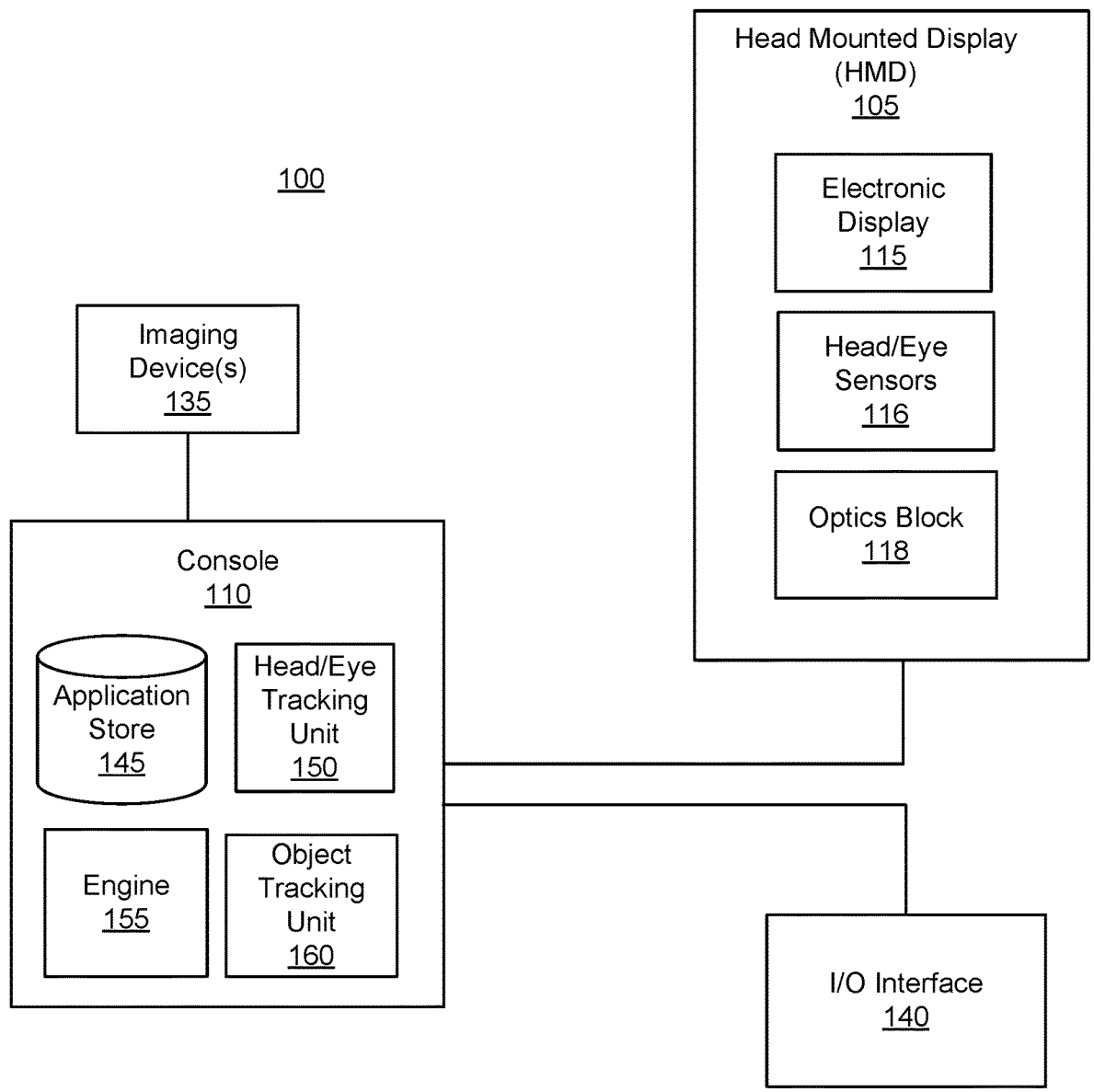
FIG. 1 is a block diagram of a system environment including an object tracking unit, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Embodiments discussed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Embodiments relate to tracking and determining one or more locations associated with an object in an environment. A system includes one or more imaging devices and an object tracking unit. The system identifies the object in a search region, determines a tracking region corresponding to the object that is smaller than the search region, and scans the tracking region to determine a location associated with the object (e.g., over time). By scanning smaller tracking regions to track precise locations of objects rather than the larger search region, smaller frames of image data are created and programmatically processed. As such, the speed and efficiency of object tracking is improved.

In some embodiment, the system generates a model of an environment. The model may be used, for example, to render video content including one or more objects in the environment for an artificial reality application. The system may generate a ranking of objects, determine tracking regions associated with the objects, scan the tracking regions according to the ranking of objects to determine locations associated with the objects over time, and generate a model of the one or more search regions or the environment based on the locations associated with the objects.

FIG. 1 is a block diagram of a system 100 including an object tracking unit 160, according to an embodiment. The system 100 may operate in a VR environment, an augmented reality (AR) environment, a mixed reality (MR) environment, or some combination thereof. The system 100 shown by FIG. 1 comprises a HMD 105 and an input/output (I/O) interface 140 that is coupled to a console 110. While FIG. 1 shows an example system 100 including one HMD 105 and one I/O interface 140, in other embodiments any number of these components may be included in the system 100. For example, there may be multiple HMDs 105 each having an associated I/O interface 140, with each HMD 105 and I/O interface 140 communicating with the console 110. In alternative configurations, different and/or additional components may be included in the system 100. Additionally, functionality described in conjunction with one or more of the components shown in FIG. 1 may be distributed among the components in a different manner than described in conjunction with FIG. 1 in some embodiments. For example, some or all of the functionality of the console 110 is provided by the HMD 105.

The HMD 105 is a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the HMD 105, the console 110, or both, and presents audio data based on the audio information. The HMD 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 105 may also act as a headset that presents virtual content to the user that is based in part on a real environment surrounding the user. For example, virtual content may be presented to a user of the HMD. The user physically may be in a room, and virtual walls and a virtual floor of the room are rendered as part of the virtual content.

The HMD 105 includes an electronic display 115, head/eye sensors 116, and an optics block 118. Some embodiments of The HMD 105 have different components than those described in conjunction with FIG. 1. Additionally, the functionality provided by various components described in conjunction with FIG. 1 may be differently distributed among the components of the HMD 105 in other embodiments, or be captured in separate assemblies remote from the HMD 105.

The electronic display 115 displays 2D or 3D images to the user in accordance with data received from the console 110. In various embodiments, the electronic display 115 comprises a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), a micro-LED display, a vertical-cavity surface-emitting laser (VCSEL) display, some other display, or some combination thereof.

The optics block 118 magnifies image light received from the electronic display 115, corrects optical errors associated with the image light, and presents the corrected image light to a user of the HMD 105. In various embodiments, the optics block 118 includes one or more optical elements. Example optical elements included in the optics block 118 include: an aperture, a Fresnel lens, a convex lens, a concave lens, a filter, a reflecting surface, or any other suitable optical element that affects image light. Moreover, the optics block 118 may include combinations of different optical elements. In some embodiments, one or more of the optical elements in the optics block 118 may have one or more coatings, such as partially reflective or anti-reflective coatings.

Magnification and focusing of the image light by the optics block 118 allows the electronic display 115 to be physically smaller, weigh less, and consume less power than larger displays. Additionally, magnification may increase the field of view of the content presented by the electronic display 115. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 118 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 115 for display is pre-distorted, and the optics block 118 corrects the distortion when it receives image light from the electronic display 115 generated based on the content.

The I/O interface 140 is a device that allows a user to send action requests and receive responses from the console 110. An action request is a request to perform a particular action. For example, an action request may be an instruction to start or end capture of image or video data, or an instruction to perform a particular action within an application. The I/O interface 140 may include one or more input devices. Example input devices include: a keyboard, a mouse, a game controller, or any other suitable device for receiving action requests and communicating the action requests to the console 110. An action request received by the I/O interface 140 is communicated to the console 110, which performs an action corresponding to the action request. In some embodiments, the I/O interface 140 may provide haptic feedback to the user in accordance with instructions received from the console 110. For example, haptic feedback is provided when an action request is received, or the console 110 communicates instructions to the I/O interface 140 causing the I/O interface 140 to generate haptic feedback when the console 110 performs an action.

The console 110 provides content to the HMD 105 for processing in accordance with information received from one or more of: the HMD 105 and the I/O interface 140. In the example shown in FIG. 1, the console 110 includes an application store 145, a head/eye tracking unit 150, an engine 155, and an object tracking unit 160. Some embodiments of the console 110 have different modules or components than those described in conjunction with FIG. 1. Similarly, the functions further described below may be distributed among components of the console 110 in a different manner than described in conjunction with FIG. 1. In some embodiments, one or more components of the console 110 may be located in the HMD 105.

The application store 145 stores one or more applications for execution by the console 110. An application is a group of instructions, that when executed by a processor, generates content for presentation to the user. Content generated by an application may be in response to inputs received from the user via movement of the HMD 105 or the I/O interface 140. Examples of applications include: gaming applications, conferencing applications, video playback applications, or other suitable applications.

The head/eye tracking unit 150 tracks a head position or an eye position of a user wearing the HMD 105. The head/eye tracking unit 150 may calibrate the system environment 100 using one or more calibration parameters and may adjust one or more calibration parameters to reduce error in determination of the position of the HMD 105 or of the I/O interface 140. For example, the head/eye tracking unit 150 communicates a calibration parameter to the object tracking unit 160 to adjust the focus of the imaging devices 135 to more accurately determine positions of objects captured by the object tracking unit 160. Additionally, if tracking of the HMD 105 is lost (e.g., the head/eye sensors 116 loses line of sight of at least a threshold number of objects), the head/eye tracking unit 150 may re-calibrate some or all of the system environment 100.

The head/eye tracking unit 150 tracks movements of the HMD 105, the user's eyes, or the I/O interface 140 using information from the head/eye sensors 116. For example, the head/eye tracking unit 150 determines a position of a reference point of the HMD 105 in a mapping of a local area based on information from the HMD 105. The head/eye tracking unit 150 provides the estimated or predicted future position of the HMD 105 or the I/O interface 140 to the engine 155.

The engine 155 generates a 3D mapping of the environment surrounding the HMD 105 (i.e., the "local area") and/or objects in the environment based on information received from the HMD 105, or the imaging device(s) 135. In some embodiments, the engine 155 determines depth information for a 3D mapping of a local area based on information received from an imaging device 135 (e.g., a depth camera). The engine 155 may calculate depth information using one or more techniques to compute depth based on structured light (SL). A SL technique may include, e.g., using triangulation and/or perceived deformation of a SL pattern that is projected onto a surface to determine depth and surface information of objects within the scene. In various embodiments, the engine 155 uses different types of information determined by the object tracking unit 160 or a combination of types of information determined by the object tracking unit 160.

The engine 155 also executes applications within the system environment 100 and receives position information, acceleration information, velocity information, predicted future positions, or some combination thereof, of the HMD 105 from the head/eye tracking unit 150. Based on the received information, the engine 155 determines content to provide to the HMD 105 for presentation to the user. For example, if the received information indicates that the user has looked to the left, the engine 155 generates content for the HMD 105 that mirrors the user's movement in a virtual environment or in an environment augmenting the local area with additional content. Additionally, the engine 155 performs an action within an application executing on the console 110 in response to an action request received from the I/O interface 140 or object tracking unit 160, and provides feedback to the user that the action was performed. The provided feedback may be visual or audible feedback via the HMD 105 or haptic feedback via the I/O interface 140.

The object tracking unit 160 determines one or more locations associated with an objects in an environment. The object may be a part of the user wearing an HMD 105, or may be some other object in the environment. The object tracking unit 160 receives image data about the object and the environment surrounding the user through one or more imaging devices 135. The object tracking unit 160 can compute (e.g., 3D) location information using the image data, or the object tracking unit 160 can send the image information to another device such as the console 110 that can determine the location information using the image data.

The one or more imaging devices 135 are configured to generate image data. The image data may include search region image data and tracking region image data. "Search region image data," as used herein, refers to image data of a search region. "Tracking region image data," as used herein, refers to image data of a tracking region. The system may include one imaging device or multiple imaging devices that capture search region image data and tracking region image data. In some embodiments, the imaging devices 135 may include one or more depth cameras that generate depth image data having pixel values (e.g., defining brightness level) that correspond with distance to the imaging device. A depth camera may include a light sensor, a structured light (e.g., infrared) emitter, and a controller. The structured light emitter projects a light pattern into a capture region. The light pattern, for example, may include a known speckle pattern. The light (e.g., infrared) sensor is pointed at the capture region, and the imaging device captures the reflected light pattern in the capture region, and uses differences in the between the projected and reflected light pattern to generate the depth image data. The controller controls the operations of the light sensor and structured light emitter. The controller is further configured to generate the depth image data based on input from the depth camera. In some embodiments, the imaging devices 135 may include color cameras, or other types of cameras.

In some embodiments, one or more imaging devices 135 are attached to the HMD 105. For example, an imaging device 135 may be positioned on the front of the HMD 105 to capture a first person perspective of the user.

Object Tracking Applications

Object tracking refers to determining one or more locations associated with an object over time. For example, one form of object tracking is hand tracking which may include tracking the "hand pose" of a hand as defined by locations of hand features (e.g., joints, finger tips, etc.). Furthermore, a hand pose or sequence of hand poses may be used to define a gesture that can be interpreted as a user input. For example, gesture/finger tracking could be used to enter user input via a virtual keyboard, activate windows, turn the pages on a book or communicate with others using hand signs. In another example, users wearing a headset may want to track or view an object in their surrounding environment in more detail. For such applications, it is desirable for a sensor to be able to have a wide field of view to locate an object (e.g., hand, object of interest) while also having a detailed field of view to track the object over time for improved object recognition accuracy and speed. A sensor used for such applications may have to trade off having a wide field of view (FOV) with having high resolution produced in a detailed FOV.

To that end, a process may include identifying an object (e.g., of interest to the user, a user's hands, or a beacon) in a search region, determining a tracking region corresponding to the object, and scanning the tracking region that is smaller in size than the search region to determine a location associated with the object. In some embodiments, an imaging device with a steering or lens mechanism may be used to scan the search region, and then scan one or more tracking regions. In some embodiments, multiple imaging devices may be used to scan or otherwise capture the search region, and then a subset of the imaging devices or some other imaging devices are selected to scan or otherwise capture one or more tracking regions. In some embodiments, the imaging device used to capture tracking regions may include sensors with narrow field of view or tight beam capacity, such as a fixed narrow field of view sensor, zoom lens, acousto-optic scanner, line scanner, narrow structured light sensor, or dense time of flight sensor.

Single Imaging Device Object Tracking

Figure 2A:
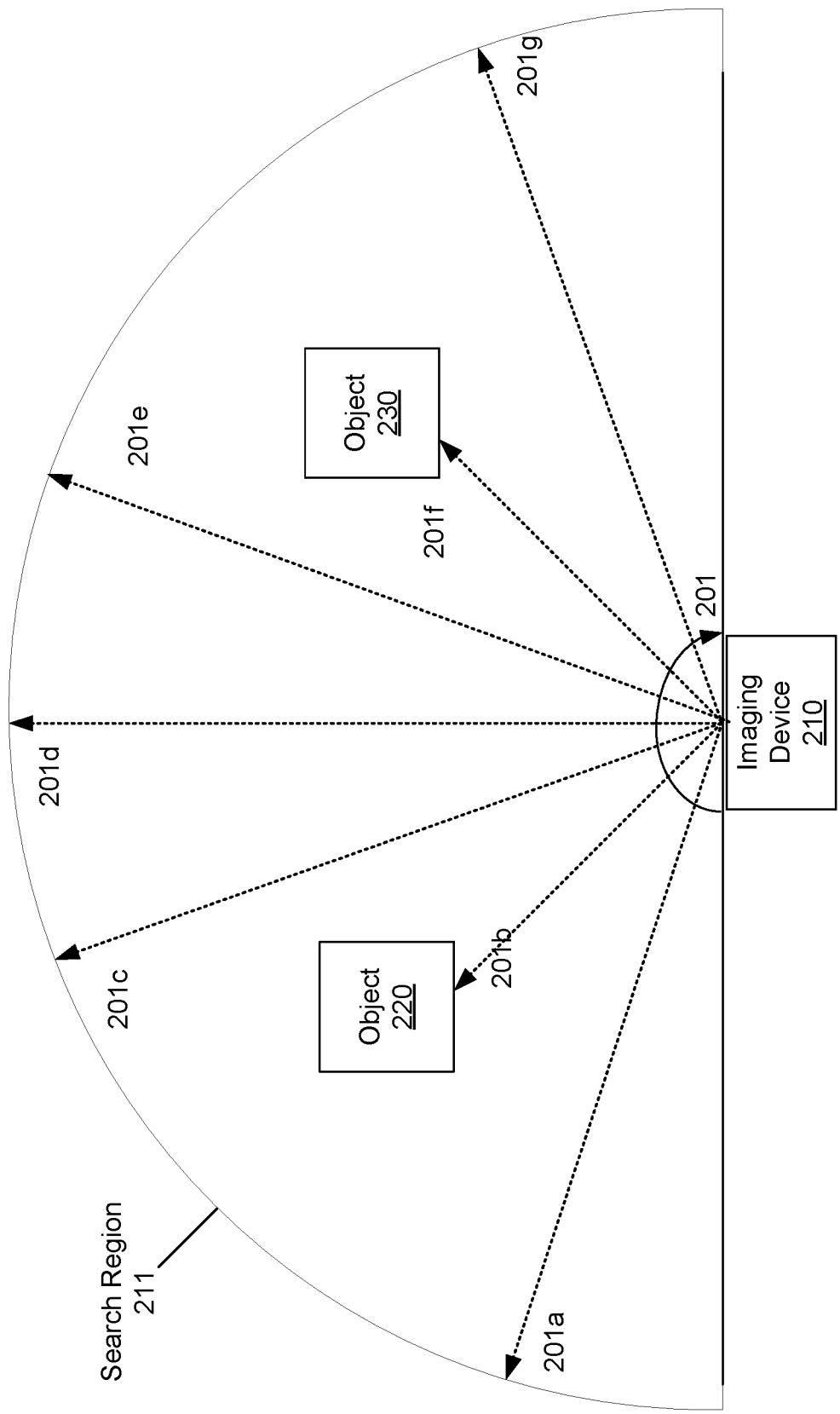
FIG. 2A illustrates a single imaging device scanning a search region, in accordance with an embodiment.
Figure 2B:
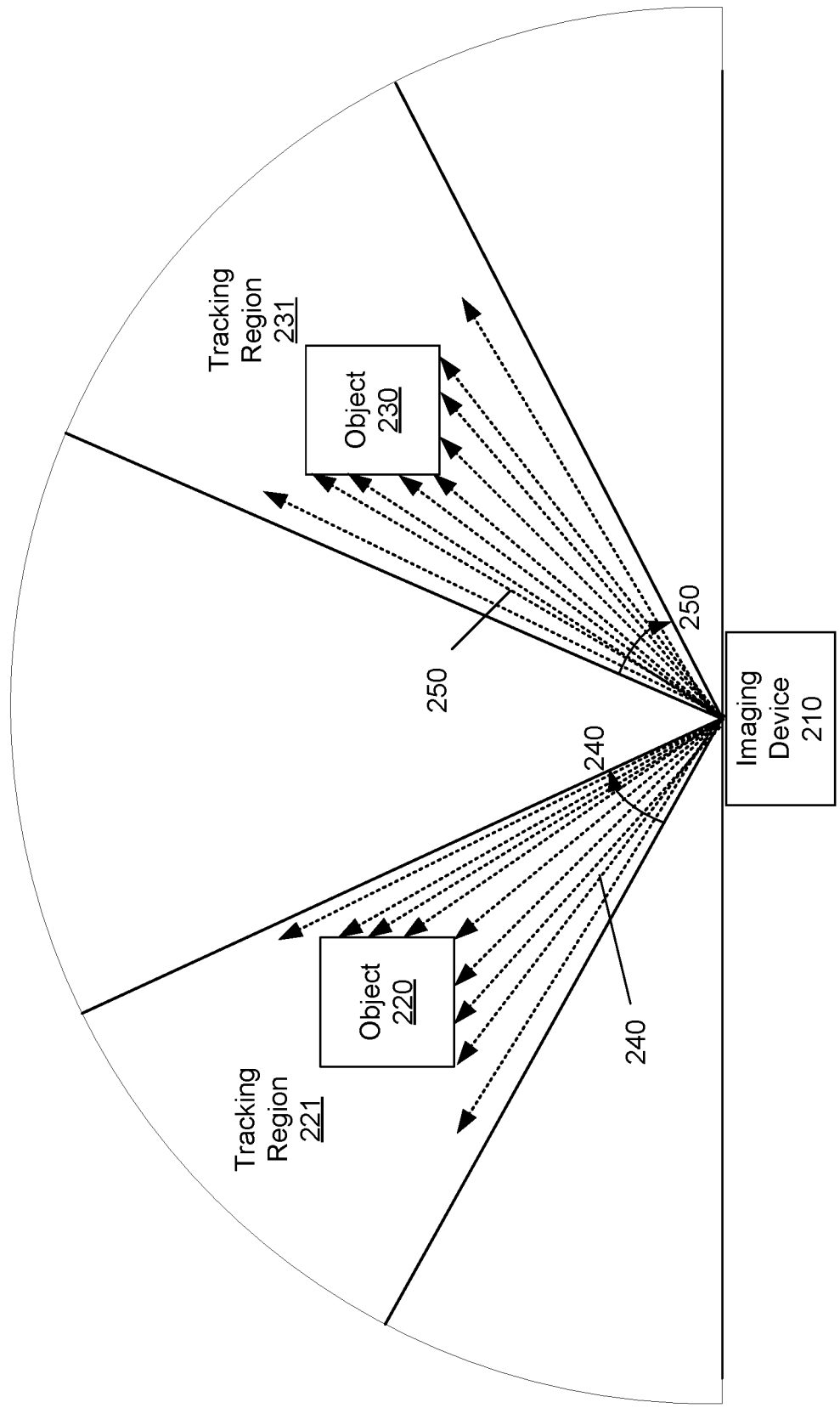
FIG. 2B illustrates a single imaging device scanning tracking regions, in accordance with an embodiment.

FIGS. 2A and 2B illustrate an embodiment which uses a single imaging device 210 for tracking and determining the location of objects 220 and 230. A system including the imaging device 210 may be the system 100 in which the imaging device 135 as a single imaging device or a different embodiment. The imaging device 210 includes a steering mechanism such as an adjustable mirror. The steering mechanism may change a direction of the FOV of the imaging device 210. The imaging device 210 may be an active sensor (e.g., MEMS type of device, an adaptive optics system, or a line scanner) and can include zoom elements (e.g. one or more lenses). In this embodiment, a first object 220 and a second object 230 are shown, but other embodiments may track a single object or more objects. The first object 220 and the second object 230 may be hands of the user, or some other object.

FIG. 2A illustrates the single imaging device 210 scanning a search region 211, in accordance with an embodiment. The search region 211 includes an environment surrounding the user. The search region 211 may be a volume including the hands of the user. In some embodiments, the search region 211 is defined by the FOV of the user based on a head position or an eye position of the user. The imaging device 210 scans the search region 211 to generate search region image data. The search region image data may be captured with a first zoom selected from the imaging device 210 including zoom elements. The imaging device 210 scans the search region 211 over angles indicated by the arrow 201. A steering mechanism of the imaging device 210 changes a direction of the FOV of the imaging device 210 to capture the entire search region 211. The number of positions or scanning motion of the imaging device 210 may be determined from the FOV of the imaging device 210 and the size of the search region 211 such that the entire search region 211 is captured by the camera. For example, an imaging device 210 with a narrow field of view may require the capture of image data at more positions than an imaging device 210 with a wider field of view to scan the entire search region. The image data captured at one position may or may not overlap with image data captured at an adjacent position. For example, the FOV of imaging device 210 is centered around positions indicated by rays 201a, 201b, 201c, 201d, 201e, 201f, and 201g to capture multiple images that are search region image data covering the search region 211. If the imaging device 210 has a narrow FOV (e.g., narrow beam SL configuration) the image data may include the depth information at the locations indicated by rays 201a-g. The imaging device 210 may have a broader FOV and there may be overlap of information from image data captured when the FOV of imaging device 210 is aligned to locations 201a and 201b. From the search region image data, the system may identify the first object 220 at a position corresponding to ray 201b and the second object 230 at a position corresponding ray 201f. Once the general location of the objects 220 and 230 are identified in the search region, the system determines smaller tracking regions corresponding to the objects 220 and 230 for a more efficient scanning and object location determination.

FIG. 2B illustrates a single imaging device 210 scanning tracking regions 221 and 231, in accordance with an embodiment. The system determines a first tracking region 221 corresponding to the first object 220, and a second tracking region 231 corresponding to the second object. The first tracking region 221 and the second tracking region 231 are smaller than the search region 211. In some embodiments, multiple objects are tracked using multiple tracking regions. The combined size of the tracking regions may be smaller than the search region 211.

In some embodiments, the tracking region is be determined based the size, movement, and location of the object being tracked. For example, the tracking region may be centered on the object, and further should be sufficiently larger than the object to capture movement of the object in successive frames of tracking region image data. Furthermore, the location of the tracking region may change for a subsequent frame of tracking region image data based on the movement of the object in the tracking region in a prior frame. The imaging device 210 scans the first tracking region 221 corresponding to object 220 over angles 240 to generate tracking region image data of the object 220. The imaging device 210 scans the second tracking region 231 corresponding to object 230 over angles 250 to generate tracking region image data of the object 230. The tracking region image data may be generated with a second zoom selected from an imaging device 210 including zoom elements. The second zoom is greater than the first zoom and may cover a smaller FOV than the first zoom to provide a more detailed view of the objects. The object in the tracking region image data may be at a higher resolution than a resolution of the object in the search region image data as a result of the zooming of the image device 210. A steering mechanism of the imaging device 210 aligns a FOV of the imaging device 210 to positions covering portions of the first tracking region 221 and the second tracking region 231. The number of positions may be determined from the size of the FOV of the imaging device 210 and the size of the first tracking region 221 and the second tracking region 231, such as to ensure capture of entire tracking regions. The image data captured at one position may overlap image data captured at an adjacent position. In this example, a FOV of imaging device 210 is centered around positions indicated by rays 240 to capture multiple images that are tracking region image data covering the first tracking region 221. The FOV of imaging device 210 is centered around positions indicated by rays 250 to capture multiple images that are tracking region image data covering the second tracking region 231. In a different example, the FOV of the imaging device 210 may be larger than the size of the tracking region 221 or 231. Here, the imaging device 210 may be directed at each tracking region without scanning across each tracking region. The system may determine locations of the first object 220 and the second object 230 based on each frame of the tracking region image data. Furthermore, multiple frames of the tracking region image data may be used to track the locations of the objects 220 and 230 over time. The tracking region may be updated based on the location of the objects in a frame. In some embodiments, if an object is not found in the tracking region, then search region may recaptured to determine a new tracking region for the object.

In some embodiments, multiple imaging devices 210 are used to scan the search region and the tracking region. For example, a second imaging device may be located in a different location as the imaging device 210 shown in FIGS. 2A and 2B, and may scan the search region and the tracking region in connection with the imaging device 210. Multiple imaging devices 210 may be used to generate pairs of image data that capture the objects from multiple views, and results of object tracking from the multiple imaging devices 210 may be combined to enhance accuracy. In some embodiments, multiple imaging devices 210 may capture different sensor input types, such as wavelength of light, polarization of light, or color temperature.

Multiple Imaging Device Object Tracking

Figure 3B:
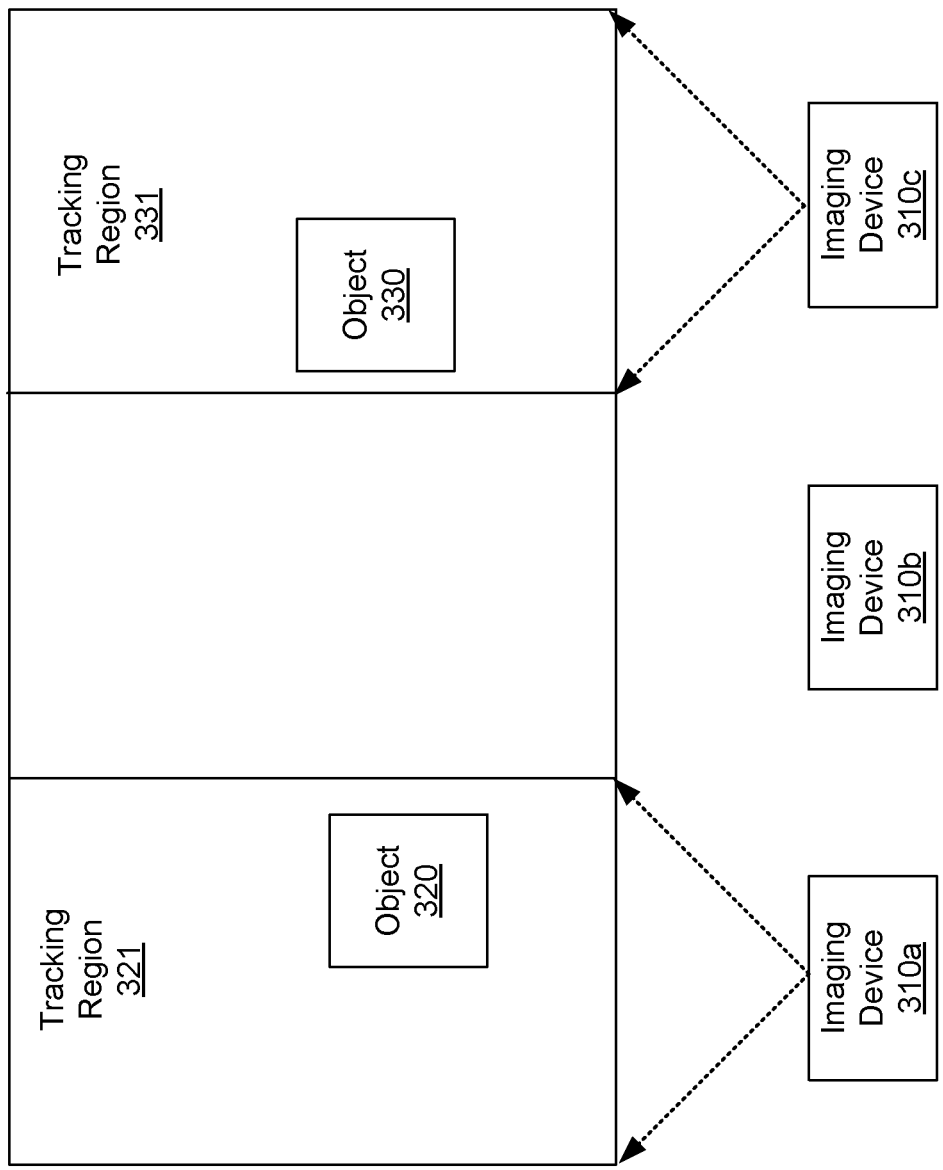
FIG. 3B illustrates selected imaging devices scanning tracking regions, in accordance with an embodiment.

FIGS. 3A and 3B illustrate an embodiment which uses multiple imaging devices 310a, 310b, and 310c for tracking and determining the location of objects 320 and 330. In some embodiments, a system including the multiple imaging devices 310a, 310b, and 310c may be the system 100 with multiple imaging device 135. The imaging devices 310a, 310b, and 310c may be passive devices, or active devices with a zoom element (e.g., one or more lenses). In this embodiment, three imaging devices 310a, 310b, and 310c and two objects 320 and 330 are shown, but other embodiments may include additional imaging devices, a single object, or more objects. The two objects 320 and 330 may be hands of the user, or some other objects.

FIG. 3A illustrates multiple imaging devices 310a, 310b, and 310c capturing a search region 311, in accordance with an embodiment. The search region 311 includes an environment. The search region 311 may be a volume including the hands of the user. In some embodiments, the search region 211 is defined by the FOV of the user based on a head position or an eye position of the user. The multiple imaging devices 310a, 310b, and 310c, capture a search region 311 to generate search region image data. The search region image data may be captured with a first zoom selected from the imaging device 310a, 310b, and 310c including zoom elements. Each imaging device 310a, 310b, and 310c covers a portion of the search region 311, and some portions covered by the imaging devices may overlap. The system identifies first object 320 and second object 330 in the search region image data. Once the general location of the objects 320 and 330 are identified in the search region, the system determines tracking regions corresponding to the objects 320 and 330 for a more detailed scan.

FIG. 3B illustrates selected imaging devices 310a and 310b scanning a tracking region 321 and 331, in accordance with an embodiment. The system determines a first tracking region 321 corresponding to first object 320 and a second tracking region 331 corresponding to second object 330. The first tracking region 321 and the second tracking region 331 are smaller than the search region 311. The system associates a first imaging device 310a with the first tracking region 321 corresponding to the first object 320 and a second imaging device 310c with the second tracking region 331 corresponding to the second object 330. The system may shut down (e.g., power off, disable) the imaging device 310b once the objects 320 and 330 have been identified and associated with imaging devices 310a and 310c to save power. The system selects the first imaging device 310a for capturing tracking region image data of the first tracking region 321. The system selects the second imaging device 310c for capturing the tracking region image data of the second tracking region 322. The first imaging device 310a captures the first tracking region 321 corresponding to the first object 320 to generate the tracking region image data. The second imaging device 310c captures the second tracking region 322 corresponding to the second object 330 to generate the tracking region image data. The tracking region image data of the first tracking region 321 may be generated with a second zoom selected from an imaging device 310a including zoom elements. The second zoom is greater than the first zoom and may cover a smaller FOV than the first zoom. The tracking region image data of the second tracking region 322 may be generated with a same zoom as the second zoom or a different zoom selected from an imaging device 310c including zoom elements. The first object and second objects in the tracking region image data may be at a higher resolution than a resolution of the first object or the second object in the search region image data.

Other Embodiments

A combination of the single imaging device 210 and the multiple imaging devices 310a, 310b, and 310c may be used for tracking and determining the location of objects. For example, the multiple imaging devices 310a, 310b, and 310c may be a set of static, low resolution cameras that initially scan the search region 311. After an object is identified, the multiple imaging devices may be shut down to save power. The system can determine the tracking region associated with the object. To perform a high resolution scan, a single imaging device 210 can scan the tracking region associated with the object. The high-resolution scan can be performed with an imaging device that is at least one of an acousto-optic scanner, a line scanner, a narrow structured light sensor, and a dense time of flight sensor. The high-resolution scan could be performed with an imaging device that can measure different sensor input types, such as wavelengths of light, polarization of light, and color temperature. Different combinations of imaging devices can be used to perform the scan of the search region and the scan of the tracking region. For example, a static depth camera assembly with a broad structured light emitter can be used to scan a search region and a dense time of flight sensor can be used to scan the tracking region. In some embodiments, two imaging devices can be used to scan a tracking region. The two imaging devices may be used to capture pairs of image data to increase accuracy of the object tracking. The two imaging devices may be in different locations (e.g., stereo vision camera). The two imaging devices capture different sensor input types from each other. For example, a first imaging device may capture wavelength and a second imaging device may capture polarization. In another example, a first imaging device captures wavelength and a second imaging device captures color temperature. In another example, a first imaging device captures polarization and a second imaging device captures color temperature.

In some embodiments, the tracking region can be determined by predicting direction and velocity of the object from previously captured images (e.g., tracking region image data or search region image data). A computed velocity vector for the object can be combined with depth information of the object (e.g., from a depth sensor) to improve the prediction of the location of the object when the scan of the tracking region occurs.

In an embodiment, the tracking region may be defined by beacons corresponding to an object attached to or held by the object. For example, the beacon may be attached to a user's hand or body (e.g., dots at joints or ends of a user's body or hands). The beacons may be located without using multiple imaging devices. The tracking region can be determined to be a region surrounding a beacon or a set of beacons associated with the object.

In one embodiment, hand and eye tracking can be used to select a search region or a tracking region in space, rather than a particular object. For example, a location where the user is looking may define the search region or a tracking region. In another example, a head position may determine the tracking region. In yet another example, a region or object that the user is pointing to or otherwise interacting with can be selected as the search region or the tracking region.

Example Process Flow

Figure 4:
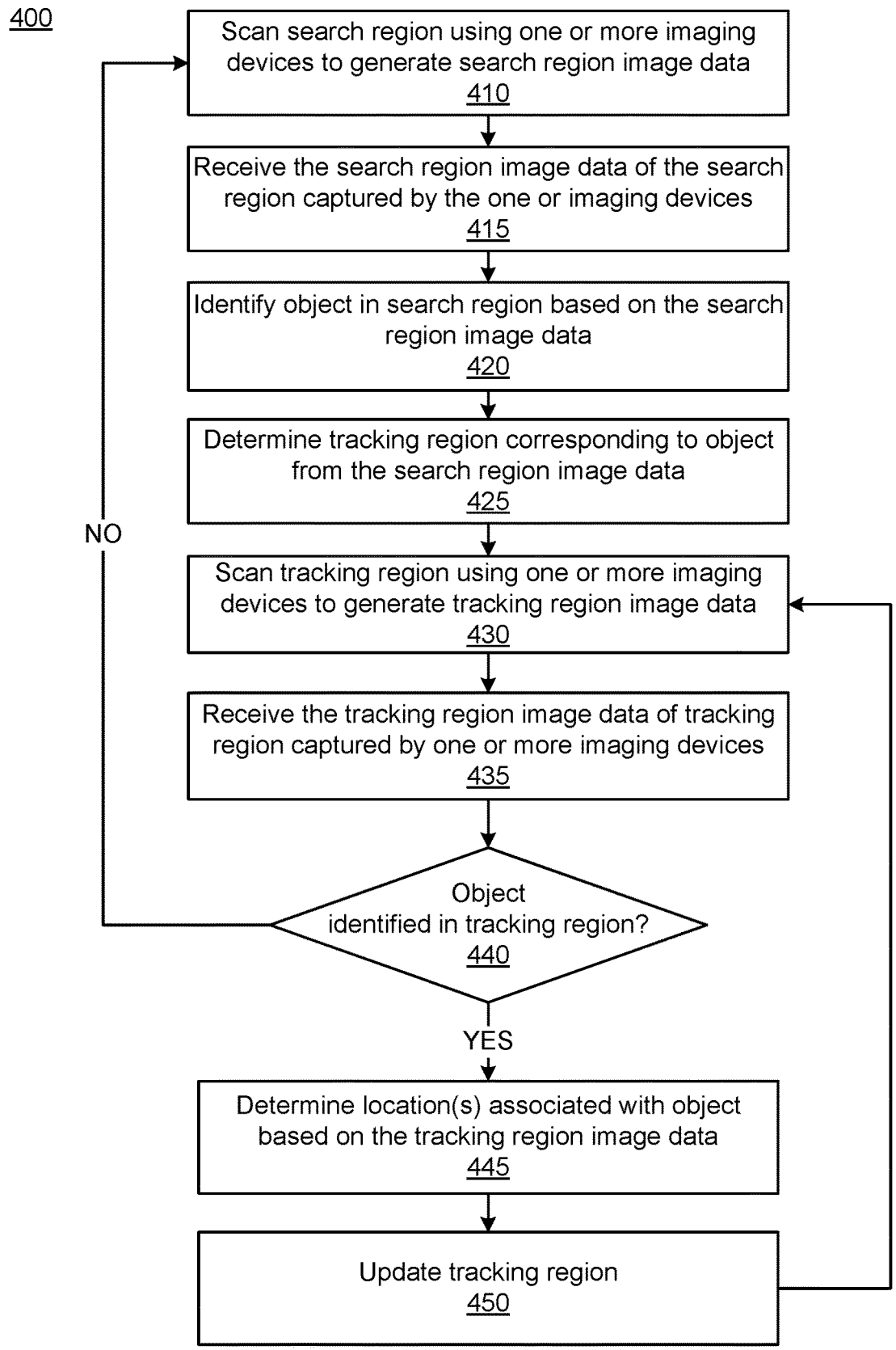
FIG. 4 illustrates a flow chart of a process for tracking an object, in accordance with an embodiment.

FIG. 4 is a flow chart of a process 400 for tracking an object, in accordance with an embodiment. The process 400 may be performed by a system including an object tracking unit, in accordance with an embodiment. The system may be the system 100 including the object tracking unit 160 with imaging device 135 as a single imaging device, or multiple imaging devices, or a different embodiment. The process 400 may include different and/or additional steps, or some steps may be in different orders.

The system scans 410 a search region using one or more imaging devices to generate search region image data. For example, an imaging device 135 near a user wearing the HMD 105, on the HMD 105, or otherwise pointed at the search region generates the search region image data. In some embodiments, the search region image data of the search region is captured with a single imaging device. The imaging device may scan the search region and generate multiple images if needed, depending on the FOV or zoom of the imaging device. In some embodiments, multiple imaging devices may collectively capture the search region image data of the search region. Here, the search region image data may include multiple images.

The object tracking unit receives 415 the search region image data of the search region captured by the one or more imaging devices. The object tracking unit may be in the console 110, as shown in FIG. 1 for the object tracking unit 160, or may be in the HMD 105. An imaging device may send imaging data to the object tracking unit via a wired or wireless connection.

The object tracking unit identifies 420 an object in the search region based on the search region image data. For example, the object tracking unit may process the search region image data to identify the object. The object may be selected based on a user input as discussed above, which may be detected via monitoring motion of the user's head, eye, hand, or other motion. In another example, the object is selected programmatically, such as based on the configuration of an executing application.

In some embodiments, the object is a hand of a user. The system may provide hand tracking for poses and gestures based on image data captured by an imaging device. For example, the object tracking unit may include a (e.g., convolutional) neural network that determines spatial locations of hand features and generates a pose of the user's hand from image data inputs. Additional details regarding using a neural network to identify objects from image data, applicable in some embodiments, are discussed in U.S. application Ser. No. 15/487,355, filed Apr. 13, 2017, which is incorporated by reference in its entirety.

The object tracking unit determines 425 the tracking region corresponding to the object from the search region image data. The tracking region is smaller than the search region, and is used to track the object over time after the object has been identified in the search region. The tracking region may be centered or substantially centered on the object, and may be updated over time as the object moves. The size of the tracking region may be determined according to the size of the object in an image of the search region image data and the (e.g., maximum, average, etc.) motion speed of the object to ensure that the object is fully captured in the tracking region.

The system scans 430 the tracking region using one or more imaging devices to generate tracking region image data. The tracking region image data may be generated by the same imaging device that generated the search region image data (e.g., at a higher zoom), or by one or more different imaging devices. In some embodiments, the tracking region is captured using an acousto-optic scanner, a line scanner, a narrow structured light sensor, or a dense time of flight sensor.

The object tracking unit receives 435 the tracking region image data of the tracking region captured by the one or more imaging devices.

The system determines 440 if the object is identified in the tracking region. For example, the system processes the tracking region image data using the convolutional neural network, or some other programmatic image recognition technique. If the object is in motion, then there is a chance the object has moved outside of the tracking region, and thus the object will fail to be identified in the tracking region.

In response to the object failing to be identified in the tracking region, the system returns to scan 410 the search region the using one or more imaging devices to generate search region image data. The system may determine an updated tracking region in the search region image data, may scan the tracking region, and so forth.

In response to the object being identified in the tracking region, the object tracking unit determines 445 one or more locations associated with the object based on the tracking region image data. An object may be associated with a single location, or multiple locations. For example, if the object is a hand of the user, then the system may identify multiple locations each associated with a hand feature of a user hand shape model to define the pose of the hand.

The system updates 450 the tracking region based on the one or more locations associated with the object. For example, the system may determine a center of the object in a frame of the tracking region image data, and may update the location of the center of the tracking region to keep the object at the center of the tracking region in a subsequent frame. In some embodiments, the system may further track the motion speed of the tracking region, such as based on analyzing the locations of the object over time, and may update the location or size of the tracking region based on the motion speed of the object.

The system scans 430 the updated tracking region using the one or more imaging devices. In general, the tracking region may be updated and used to track locations associated with the object over time. If the object fails to be detected in the tracking region, the system may attempt to scan the search region (e.g., with wider FOV and lower resolution) to detect the object, and then continue the higher resolution tracking region scan.

Although the process 400 is discussed for tracking a single object with a tracking region, the process 400 may be used to track multiple objects. Multiple objects may be identified in a search region, and a tracking region for each object may be determined and used to determine locations associated with each object over time. Rather than scanning and processing the entire search region to track an object, the use of smaller tracking regions improves the accuracy and speed of object tracking.

User Assisted Object Tracking

Artificial reality systems may incorporate environmental objects into informational displays, such as to supply the user with information about the object or to provide a virtual enhancement (e.g., overlay) for the object. It is desirable for the system to incorporate the new information as the environment changes. However, certain objects may be of higher interest and importance to a particular user or application. For example, an object that is manipulated by the user may be more important than a passive object in the environment. In some embodiments, user input or programmatic instructions may be used to rank objects for scan using tracking regions. Such an approach can improve the user experience with the system by increasing the speed and accuracy of object tracking and environmental modeling.

Figure 5:
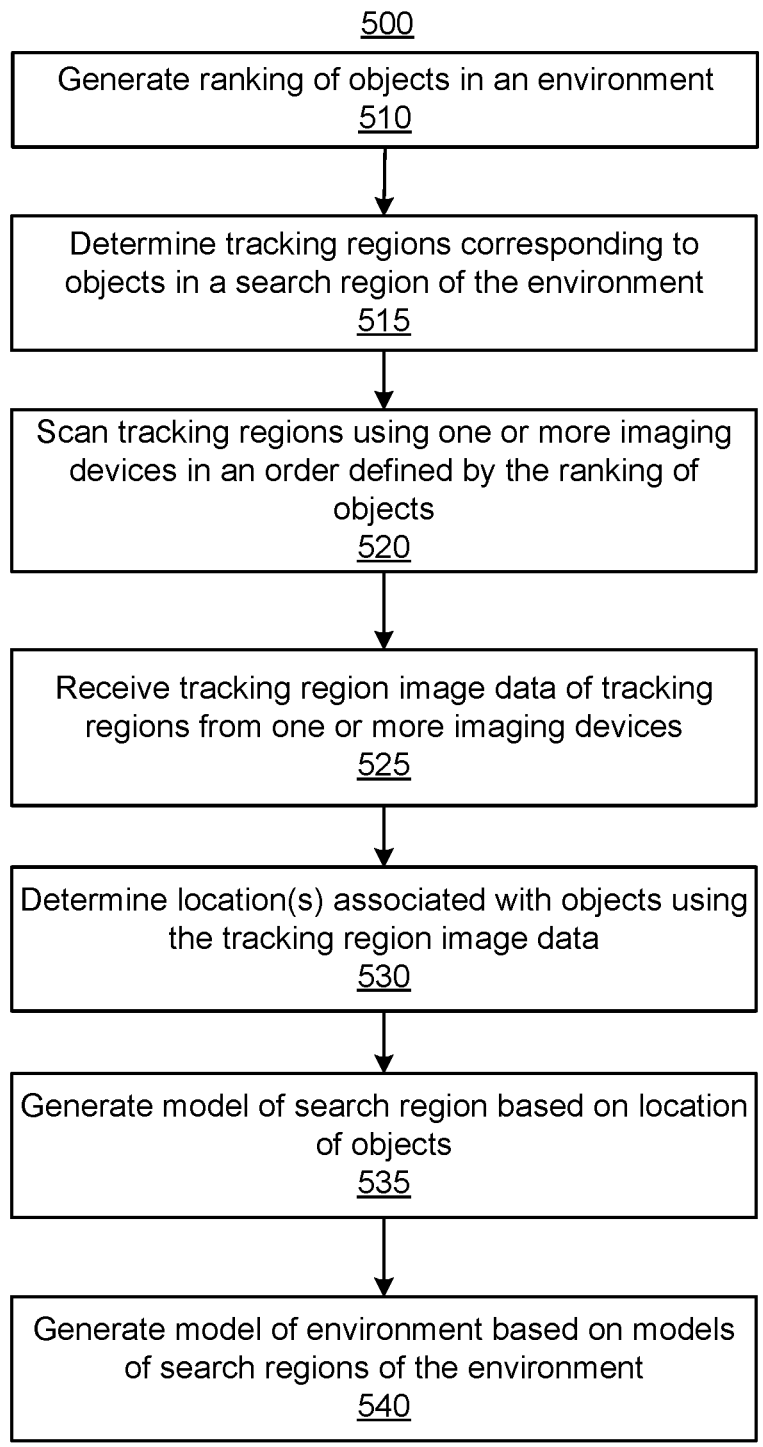
FIG. 5 illustrates a flow chart of a process for generating a model of an environment by tracking multiple objects in the environment, in accordance with an embodiment.

FIG. 5 illustrates a flow chart of a process 500 for generating a model of an environment by tracking multiple objects in the environment, in accordance with an embodiment. The system may be the system 100 including the object tracking unit 160 with imaging device 135 as a single imaging device or multiple imaging devices or a different embodiment. The process 500 may include different and/or additional steps, or some steps may be in different orders.

The system generates 510 a ranking of objects in an environment. For example, the system may scan one or more search regions in the environment to identify objects as discussed in the process 400, and then may generate the ranking of the objects. The ranking of objects defines a priority for tracking region scanning. The ranking may be based on the relevance of the objects to an application or activity. For example, a controller, stylus, or the like, that is manipulated by a user may be given a higher ranking than a background object behind the user.

In some embodiments, the ranked objects are a subset of objects captured in the search region. The system may programmatically identify particular types of objects, such as hands or other interactive objects, and exclude other (e.g., background, non-interactive, non-moving, etc.) objects from the ranking. In some embodiments, an object is identified for ranking based on user input via hand, eye, or head tracking that indicates the object is of interest.

The system determines 515 tracking regions corresponding to objects in a search region of the environment. The system scans 520 tracking regions using one or more imaging devices in an order defined by the ranking of objects. For example, the system may use one or more imaging devices to capture multiple tracking regions, each imaging device being assigned to an object. Upon completion of the capturing of an object, an imaging device may capture an additional tracking region image data for another object in the order defined by the ranking of objects. If a single imaging device is used to capture the tracking region image data, then the imaging device may capture multiple tracking regions according the ranking of objects.

The system receives 525 the tracking image data of tracking regions from one or more imaging devices. The system determines 530 locations associated with objects using the tracking region image data.

The system generates 535 a model of the search region based on location of objects. The model of the search region is a virtual representation of at least a portion of the environment as captured in a search region. The model may include the objects that are tracked using tracking regions, as well as other objects in the environment. The model may define the size, shape, and locations of objects.

The system generates 540 a model of the environment based on models of search regions of the environment. As a user moves in the environment, an imaging device (e.g., on the HMD 105) may capture multiple search regions. The system may aggregate objects and models of multiple search regions in to an aggregated model of the environment. The model represents the area around the object tracking unit/HMD and can include data aggregated from multiple search regions, as well as multiple tracking regions for each search region.

In some embodiments, the system may include a hand tracking unit configured to determine a hand pose of a user. The hand pose defines spatial locations of hand features (joints, end nodes, etc.). A hand pose may be a hand or finger gesture, which is a pose or sequences of poses associated with a particular user input. The object tracking unit may determine a selection of an object using a hand pose. Inputs from the user via the hand tracking unit can be used to select objects for a detailed scan or control object scan ranking. For example, a user can select an object of interest by pointing to an object. The user may indicate via a hand gesture to select the object for detailed scanning (e.g., snap, swipe, etc.). The user may use a finger gesture (e.g., number of snaps, number of swipes, number of fingers, etc.) to set a ranking for an object.

In one embodiment, a user can make a box with fingers to frame a scene including an object of interest. The selection may be sent to a time of flight sensor to help verify selection. The user may click or snap the fingers to verify the object. The system may start a detailed scan of the object. Alternatively, the user may box a scene, and the system can scan everything in the scene at different depths.

In some embodiments, the system may include an eye tracking unit to determine an eye position of an eye of the user. The eye position may be a gaze of the user or an eye gesture. A gaze of a user is determined by the position of two eyes of the user. An eye gesture is an eye position or a sequence of eye positions associated with a particular user input. The object tracking unit may determine a selection of an object using an eye position. Inputs from the user via the eye tracking unit can be used to select objects for a detailed scan or control object scan ranking. For example, a gaze of the user can be used to identify an object of interest. The user may indicate via an eye gesture (e.g., blink, wink) that an object is selected for detailed scanning. The user may use an eye gesture (e.g., blink, wink, number of blinks or winks) to set a ranking for an object.

In some embodiments, a user's gaze can be used to create a scanning/tracking region or zone. The system can scan everything in the zone at different depths. Alternatively, the user gaze can define a zone, and the user can provide another input such as click, snap, blink, or wink, to verify a selection of an object in the zone.

In some embodiments, use of hand and eye tracking can control a beam location for an imaging device including a depth camera assembly. The beam location may be a single wide spotlight or a spatially clustered spotlight.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
one or more imaging devices configured to generate image data; and
a processor configured to:
receive search region image data of a search region captured by the one or more imaging devices;
identify an object in the search region based on the search region image data;
determine a tracking region corresponding to the object from the search region image data, the tracking region being smaller than the search region;
subsequent to determining the tracking region, control the one or more imaging devices to scan the tracking region to capture tracking region image data;
receive the tracking region image data of the tracking region captured by the one or more imaging devices; and
responsive to failing to detect the object in the tracking region image data:
control the one or more imaging devices to scan the search region to capture updated search region image data to detect the object,
update the tracking region based on the updated search region image data,
control the one or more imaging devices to scan the updated tracking region to capture updated tracking region image data, and
determine a location associated with the object based on the updated tracking region image data of the updated tracking region.

2. The system of claim 1, wherein the one or more imaging devices include:
a first imaging device configured to generate the search region image data of the search region; and
a second imaging device configured to generate the tracking region image data of the tracking region.

3. The system of claim 2, wherein:
the second imaging device is configured to generate a first portion of the tracking region image data;
the one or more imaging devices include a third imaging device configured to generate a second portion of the tracking region image data of the tracking region; and
the first and second imaging devices are at least one of: located in different locations or capture different sensor input types.

4. The system of claim 1, wherein the one or more imaging devices includes a single imaging device configured to scan the search region to generate the search region image data and scan the tracking region to generate the tracking region image data, wherein the single imaging device includes one or more lenses to generate the search region image data at a first zoom and the tracking region image data at a second zoom greater than the first zoom.

5. The system of claim 1, wherein the processor configured to identify the object includes the processor being configured to determine a selection of the object using at least one of a hand pose of a user and an eye position of the user.

6. The system of claim 1, wherein the object in the search region image data is at a first resolution and the object in the tracking region image data is at a second resolution higher than the first resolution.

7. The system of claim 1, wherein:
the one or more imaging devices include a first imaging device and a second imaging device;
the processor is further configured to:
identify a second object in the search region based on the search region image data;

determine a second tracking region corresponding to the second object from the search region image data, the second tracking region being smaller than the search region;

select the first imaging device for capturing the tracking region image data of the tracking region;

select the second imaging device for capturing the tracking region image data of the second tracking region;

receive the tracking region image data captured by the first imaging device;

receive the tracking region image data of the second tracking region captured by the second imaging device; and determine a second location associated with the second object based on the tracking region image data of the second tracking region.

8. The system of claim 1, wherein the one or more imaging devices include multiple imaging devices, each imaging device configured to generate a portion of the search region image data of the search region, and wherein the processor is further configured to:

associate each of the imaging devices with a different tracking region; and select an imaging device from the multiple imaging devices based on the tracking region of the object, wherein the imaging device is configured to generate tracking region image data of the tracking region.

9. The system of claim 1, wherein the processor is further configured to:

generate a ranking of objects;

determine tracking regions corresponding to the objects;

receive a set of image data of the tracking regions corresponding to the objects according to the ranking of the objects, the one or more imaging devices capturing the set of image data according to the ranking of the objects;

determine locations associated with the objects using the set of image data; and generate a model of the search region based on the locations associated with the objects.

10. A method comprising:

receiving search region image data of a search region from one or more imaging devices;

identifying an object in the search region based on the search region image data;

determining a tracking region corresponding to the object from the search region image data, the tracking region being smaller than the search region;

subsequent to determining the tracking region, controlling the one or more imaging devices to scan the tracking region to capture tracking region image data;

receiving the tracking region image data of the tracking region captured by the one or more imaging devices; and responsive to failing to detect the object in the tracking region image data:

controlling the one or more imaging devices to scan the search region to capture updated search region image data to detect the object, updating the tracking region based on the updated search region image data, controlling the one or more imaging devices to scan the updated tracking region to capture updated tracking region image data, and determining a location associated with the object based on the updated tracking region image data of the updated tracking region.

11. The method of claim 10, wherein the one or more imaging devices include:

a first imaging device configured to generate the search region image data of the search region; and a second imaging device configured to generate tracking region image data of the tracking region.

12. The method of claim 11, wherein:

the second imaging device is configured to generate a first portion of the tracking region image data;

the one or more imaging devices include a third imaging device configured to generate a second portion of the tracking region image data of the tracking region; and the first and second imaging devices are at least one of: located in different locations or capture different sensor input types.

13. The method of claim 10, wherein identifying the object in the search region based on the search region image data comprises:

determining at least one of a hand pose and an eye position of a user; and determining a selection of the object using at least one of the hand pose and the eye position.

14. The method of claim 10, wherein the object in the search region image data is at a first resolution and the object in the tracking region image data is at a second resolution higher than the first resolution.

15. The method of claim 10, wherein the one or more imaging devices include a first imaging device and a second imaging device, the method further comprising:

identifying a second object in the search region based on the search region image data;

determining a second tracking region corresponding to the second object from the search region image data, the second tracking region being smaller than the search region;

selecting the first imaging device for capturing the tracking region image data of the tracking region;

selecting the second imaging device for capturing the tracking region image data of the second tracking region;

receiving the tracking region image data captured by the first imaging device;

receiving the tracking region image data of the second tracking region captured by the second imaging device; and determining a second location associated with the second object based on the tracking region image data of the second tracking region.

16. The method of claim 10, wherein the one or more imaging devices include multiple imaging devices, each imaging device configured to generate a portion of the search region image data of the search region, the method further comprising:

associating each of the imaging devices with a different tracking region; and selecting an imaging device from the multiple imaging devices based on the tracking region of the object, wherein the imaging device is configured to generate tracking region image data of the tracking region.

17. The method of claim 10, further comprising:

generating a ranking of objects;

determining tracking regions corresponding to the objects;

receiving a set of image data of the tracking regions corresponding to the objects according to the ranking of the objects, the one or more imaging devices capturing the set of image data according to the ranking of the objects;

determining locations associated with the objects using the set of image data; and generating a model of the search region based on the locations associated with the objects.

18. The system of claim 1, wherein the one or more imaging devices includes a single imaging device with a steering mechanism to change a direction of a field of view of the single imaging device over first angles to scan the search region to generate the search region image data and over second angles to scan the tracking region to generate the tracking region image data.

19. The system of claim 1, wherein the one or more imaging devices include a plurality of low resolution cameras to scan the search region to generate the search region image data, and a high-resolution imaging device to scan the tracking region to generate the tracking region image data, the high-resolution imaging device including at least one of an acoustic-optic scanner, a line scanner, a narrow structured light sensor, and a dense time of flight sensor.

20. The system of claim 1, wherein the one or more imaging devices includes a static depth camera assembly with a broad structured light emitter to scan the search region to generate the search region image data, and a dense time of flight sensor to scan the tracking region to generate the tracking region image data.

* * * * *